US010645750B2

(12) United States Patent
Tenny et al.

(10) Patent No.: US 10,645,750 B2
(45) Date of Patent: May 5, 2020

(54) ADVANCE SCHEDULING FOR DISCONTINUOUS TRANSMISSION AND RECEPTION USING UPLINK BEACONS

(71) Applicant: Futurewei Technologies, Inc., Plano, TX (US)

(72) Inventors: Nathan Edward Tenny, Poway, CA (US); Tao Cai, Taeby (SE); Johan Christer Qvarfordt, Stockholm (SE)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 264 days.

(21) Appl. No.: 15/344,413

(22) Filed: Nov. 4, 2016

(65) Prior Publication Data

US 2018/0049268 A1    Feb. 15, 2018

Related U.S. Application Data

(60) Provisional application No. 62/375,270, filed on Aug. 15, 2016.

(51) Int. Cl.
*H04W 76/28*     (2018.01)
*H04W 72/12*     (2009.01)
(Continued)

(52) U.S. Cl.
CPC ........... *H04W 76/28* (2018.02); *H04W 48/10* (2013.01); *H04W 52/0216* (2013.01);
(Continued)

(58) Field of Classification Search
None
See application file for complete search history.

(56) References Cited

U.S. PATENT DOCUMENTS 8,897,202 B2 * 11/2014 Chen ............... H04B 7/155
370/310
10,129,857 B2 * 11/2018 Sun ................. H04L 5/0007
(Continued)

FOREIGN PATENT DOCUMENTS

CN     105519167 A    4/2016
CN     105659690 A    6/2016
(Continued)

OTHER PUBLICATIONS

3GPP TS 36.321, "3rd Generation Partnership Project; Technical Specification Group Radio Access Network; Evolved Universal Terrestrial Radio Access (E-UTRA) Medium Access Control (MAC) Protocal Specification (Release 8)", 2009, vol. 8.7.0, pp. 1-47.
(Continued)

*Primary Examiner* — Xavier S Wong
(74) *Attorney, Agent, or Firm* — Slater Matsil, LLP

(57) ABSTRACT

A method for assigning radio resources to a UE comprises receiving an uplink beacon transmission during a beacon occasion of the UE, determining that the uplink beacon transmission corresponds to a need by the UE for radio resources in an upcoming communication occasion of a discontinuous communication mode implemented by the UE, identifying at least one TRP to participate in data communication with the UE, receiving a grant of radio resources for the data communication, wherein the grant of radio resources is specified for use in the upcoming communication occasion, and transmitting the grant of radio resources to the UE.

24 Claims, 10 Drawing Sheets

(51) Int. Cl.
*H04W 48/10* (2009.01)
*H04W 72/14* (2009.01)
*H04W 52/02* (2009.01)

(52) U.S. Cl.
CPC ....... *H04W 72/1278* (2013.01); *H04W 72/14* (2013.01); *H04W 52/0229* (2013.01); *Y02D 70/00* (2018.01); *Y02D 70/10* (2018.01); *Y02D 70/12* (2018.01); *Y02D 70/126* (2018.01); *Y02D 70/1242* (2018.01); *Y02D 70/1262* (2018.01); *Y02D 70/14* (2018.01); *Y02D 70/142* (2018.01); *Y02D 70/144* (2018.01); *Y02D 70/166* (2018.01); *Y02D 70/20* (2018.01); *Y02D 70/24* (2018.01); *Y02D 70/25* (2018.01); *Y02D 70/26* (2018.01)

(56) References Cited

U.S. PATENT DOCUMENTS

| | | | | |
|---|---|---|---|---|
| 2008/0167089 | A1* | 7/2008 | Suzuki | H04L 1/1829 455/574 |
| 2009/0238098 | A1* | 9/2009 | Cai | H04W 76/28 370/254 |
| 2009/0239568 | A1* | 9/2009 | Bertrand | H04W 52/0225 455/522 |
| 2011/0059745 | A1 | 3/2011 | Yi et al. | |
| 2011/0128865 | A1* | 6/2011 | Doppler | H04W 52/0206 370/252 |
| 2012/0309394 | A1* | 12/2012 | Radulescu | H04W 28/18 455/436 |
| 2013/0065525 | A1* | 3/2013 | Kiukkonen | H04W 52/36 455/41.2 |
| 2013/0258919 | A1 | 10/2013 | Damnjanovic | |
| 2015/0098379 | A1* | 4/2015 | Lunden | H04W 52/0209 370/311 |
| 2015/0185015 | A1* | 7/2015 | Zukerman | G01C 21/00 701/468 |
| 2015/0327116 | A1* | 11/2015 | Zhang | H04W 72/1284 370/329 |
| 2016/0112913 | A1* | 4/2016 | Malkamaki | H04W 36/0055 455/444 |
| 2016/0127988 | A1* | 5/2016 | Yao | H04W 48/18 370/338 |
| 2016/0135172 | A1* | 5/2016 | Sun | H04L 5/0007 370/329 |
| 2016/0174236 | A1 | 6/2016 | Guo | |
| 2016/0219619 | A1 | 7/2016 | Guo | |
| 2016/0255619 | A1 | 9/2016 | Yi et al. | |
| 2016/0323887 | A1* | 11/2016 | Patel | H04W 52/365 |
| 2017/0019903 | A1* | 1/2017 | Talukdar | H04B 7/086 |
| 2017/0164419 | A1 | 6/2017 | Kim | |
| 2017/0230871 | A1* | 8/2017 | Rangaswamy | H04L 61/2007 |
| 2017/0359849 | A1* | 12/2017 | Zhang | H04W 72/1257 |

FOREIGN PATENT DOCUMENTS

| | | |
|---|---|---|
| WO | 2014098924 A1 | 6/2014 |
| WO | 2016095078 A1 | 6/2016 |
| WO | 2017028875 A1 | 2/2017 |

OTHER PUBLICATIONS

Gelabert et al., "Uplink Reference Signals Enabling User-Transparent Mobility in Ultra Dense Networks", 2016 IEEE 27th Annual IEEE International Symposium on Personal, Indoor and Mobile Radio Communications—(PIMRC): MAC & Cross-Layer Design, 2016, pp. 1-6.

* cited by examiner

ADVANCE SCHEDULING FOR DISCONTINUOUS TRANSMISSION AND RECEPTION USING UPLINK BEACONS

TECHNICAL FIELD

The present invention relates generally to a system and method for wireless communication, and, in particular embodiments, to a system and method for advance scheduling for discontinuous transmission and reception using uplink beacons.

BACKGROUND

Discontinuous reception (DRX) is a power saving technique that can be used by a user equipment (UE) in a wireless telecommunication system. A UE that implements DRX periodically enters a sleep state or off-period by powering down much of its circuitry for a period of time. The UE then wakes up for a brief period of time to listen for control signaling from the network. The timing of the sleep and wake cycles may be coordinated with the network so that the UE is awake when the network has downlink signaling to send to the UE. Any data in the downlink direction for a UE in connected mode DRX will be delayed until the next DRX waking occasion or on-period, which is the network's next chance to contact the UE. A conventional DRX cycle comprises no signal reception activity between on-periods, as the intention is to allow the UE to power off its baseband for as long as possible. Any communication in the off-period compromises the power saving goal.

When the UE has data to transmit on the uplink, there are at least two possible DRX configurations, known as data-scheduled DRX and inactivity-based DRX. Data-scheduled DRX may be referred to as semi-persistent scheduling in Long-Term Evolution (LTE) and may be referred to as HS-SCCH-less (High-Speed Shared Control Channel-less) scheduling in Universal Mobile Telecommunications System (UMTS).

In data-scheduled DRX, the length of time between waking occasions, known as the DRX period or DRX cycle, is relatively short. The UE wakes at regularly scheduled intervals, and a data packet is transmitted in one direction or both in each on-period. That is, the UE waits for the next DRX occasion and transmits on an already scheduled grant of resources. The configuration of on-periods and off-periods persists until being switched off or modified by the network.

In inactivity-based DRX, a UE may enter a DRX off-period due to a low level of activity on the UE. The DRX period is relatively long and can become longer based on an inactivity timer. That is, the UE may go "deeper asleep" for a longer period of inactivity. When a DRX off-period has occurred because of low activity, the UE may request an uplink grant immediately upon coming out of its off-period. Any data transmission in either direction cancels the DRX configuration and the UE wakes up.

Selection of these configurations is semi-static and controlled by the network. In either configuration, the durations of the on-periods and off-periods may also be controlled by the network, and thus the term "configuration" in this context may refer to the use of either data-scheduled DRX or inactivity-based DRX as well as the use of specified on-period durations and off-period durations.

In addition to DRX, discontinuous transmission (DTX) is also possible, and DRX and/or DTX may be referred to more generically as a discontinuous communication mode. Thus, when a UE is referred to herein as being in DRX, it should be understood that the UE is in a discontinuous communication mode. Similarly, when a DRX period, DRX cycle, DRX on-period, or DRX off-period is referred to herein, it should be understood that a period, cycle, on-period, or off-period of a discontinuous communication mode is being referred to. Other references to DRX should be understood similarly.

SUMMARY

In accordance with an embodiment of the present invention, a method for assigning radio resources to a UE comprises receiving an uplink beacon transmission during a beacon occasion of the UE, determining that the uplink beacon transmission corresponds to a need by the UE for radio resources in an upcoming communication occasion of a discontinuous communication mode implemented by the UE, identifying at least one TRP to participate in data communication with the UE, receiving a grant of radio resources for the data communication from the identified at least one TRP, wherein the grant of radio resources is specified for use in the upcoming communication occasion, and transmitting the grant of radio resources to the UE.

In accordance with another embodiment of the present invention, a method for communication by a UE comprises transmitting, during an off-period of a discontinuous communication mode implemented by the UE, a beacon containing at least one of a scheduling request or a buffer status report, receiving, at a next on-period of a discontinuous communication mode implemented by the UE, a grant of radio resources for communication with at least one TRP, and communicating between the UE and the at least one TRP in the granted radio resources.

In accordance with another embodiment of the present invention, a network node comprises a non-transitory memory storage comprising instructions and one or more processors in communication with the memory. The one or more processors execute the instructions to receive an uplink beacon transmission from a UE during a beacon occasion of the UE, determine that the uplink beacon transmission corresponds to a need by the UE for radio resources in an upcoming communication occasion of a discontinuous communication mode implemented by the UE, identify at least one TRP to participate in data communication with the UE, receive a grant of radio resources for the data communication from the identified at least one TRP, wherein the grant of radio resources is specified for use in the upcoming communication occasion, and transmit the grant of radio resources to the UE.

In accordance with another embodiment of the present invention, a UE comprises a transmitter and a receiver. The transmitter is configured to transmit, during an off-period of a discontinuous communication mode implemented by the UE, a beacon containing at least one of a scheduling request or a buffer status report. The receiver is configured to receive, at a next on-period of a discontinuous communication mode implemented by the UE, a grant of radio resources for communication with at least one TRP, wherein the UE and the at least one TRP communicate in the granted radio resources.

In accordance with another embodiment of the present invention, a TRP comprises a non-transitory memory storage comprising instructions and one or more processors in communication with the memory. The one or more processors execute the instructions to receive from a network node a request for measurements of at least one uplink beacon transmission, receive an uplink beacon transmission from a UE during a beacon occasion of the UE, transmit measurements of the received uplink beacon transmission to the network node, receive from the network node a request for a grant of radio resources for data communication by the UE, specify the grant of radio resources for use in an upcoming communication occasion, transmit the grant of radio resources for the data communication, and communicate with the UE in the granted radio resources.

In accordance with another embodiment of the present invention, a method for communication by a TRP comprises receiving from a network node a request for measurements of at least one uplink beacon transmission, receiving an uplink beacon transmission from a UE during a beacon occasion of the UE, transmitting measurements of the received uplink beacon transmission to the network node, receiving from the network node a request for a grant of radio resources for data communication by the UE, specifying the grant of radio resources for use in an upcoming communication occasion, transmitting the grant of radio resources for the data communication, and communicating with the UE in the granted radio resources.

An advantage of an embodiment is that a UE may reduce its DRX on-duration, compared to the case where the UE starts transmission of a scheduling request and/or a buffer status report at a DRX occasion.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
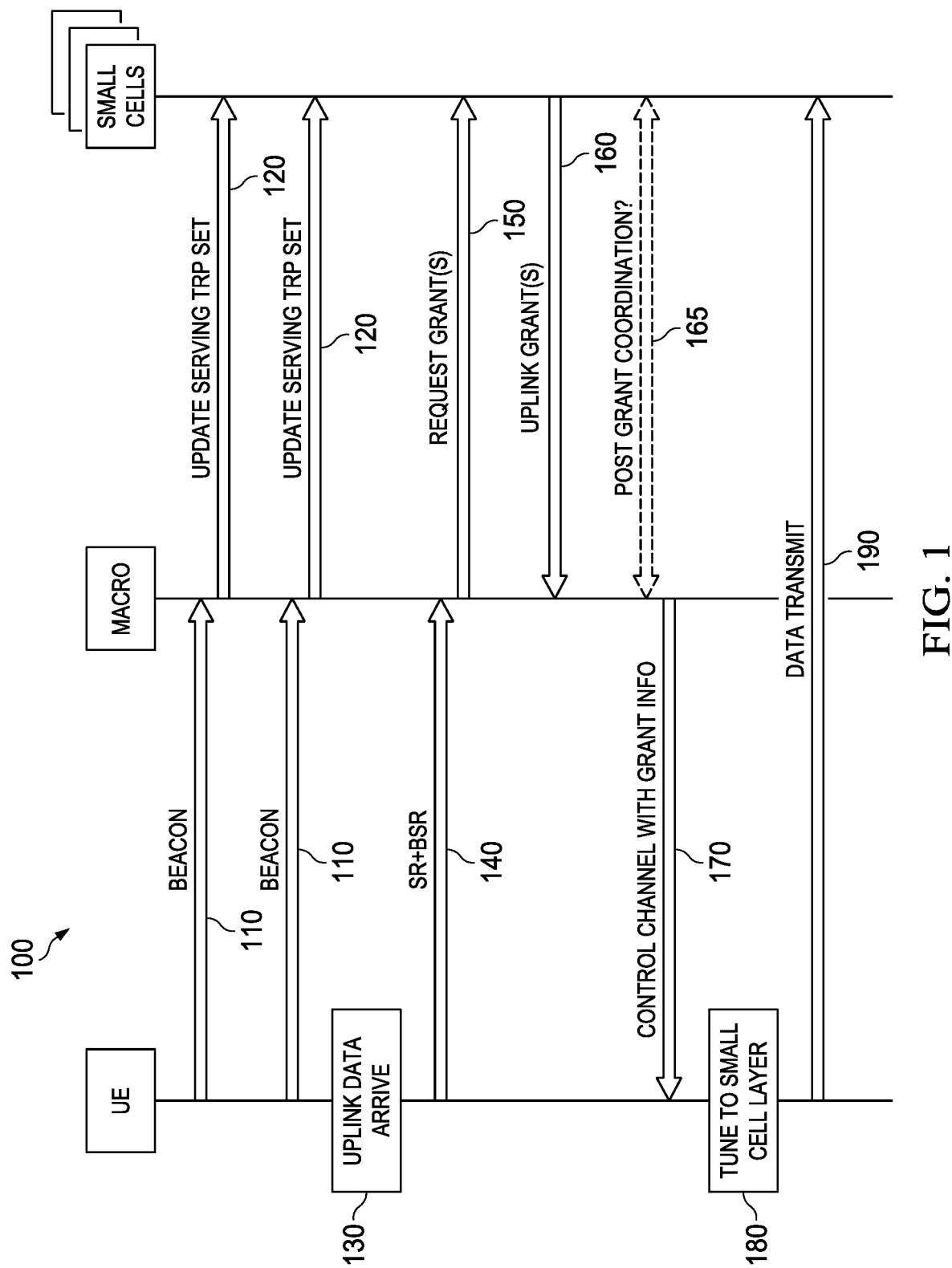
FIG. 1 is a flow diagram illustrating actions that may be taken in a dual layer situation when a UE needs an uplink grant to transmit data.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A wireless communication network may include relatively larger cells, which may be referred to herein as macro cells, and/or relatively smaller cells. Communication in macro cells may be controlled by a base station, an evolved node B (eNB), a gNode B (gNB), or a similar component. Any such component may be referred to herein as a network node. Communication in smaller cells may be controlled by a transmit/receive point (TRP). As used herein, the term "TRP" may refer to any component that promotes communication with a UE in a small cell. Actions described herein as being performed by a macro cell or a small cell may be understood as being performed by network node or a TRP. A plurality of macro cells and/or small cells may be referred to herein as a network.

A UE may periodically transmit a low power beacon signal to indicate to a network that the UE is present in the network. Beacons are primarily intended to promote efficient mobility, but may also be used for positioning. That is, the network may monitor for the beacons and may thereby determine approximately where the UE is located. A UE's beacon may be sent in a separate transmission chain from baseband transmissions, so the more power-consuming baseband can sleep while the less power-consuming beacon is transmitted. Therefore, the beacon can be transmitted at more frequent intervals than the DRX cycle without impact to the baseband. A beacon may occupy reserved radio resources in the uplink, such as the first few symbols of a subframe. The content of a beacon may be defined using a Zadoff-Chu sequence or a similar orthogonal sequence. A quasi-orthogonal sequence may also be used but may be less effective.

When a UE is in motion in a single layer case, that is, in a case where macro cells are present but small cells are not, the uplink resources, beacon configuration, UE ID, and other parameters related to UE mobility are agreed upon among the cells that collectively serve some region of the network. The UE transmits the beacon periodically, without monitoring the downlink. The UE broadcasts the beacon rather than directing the beacon to a particular base station. Based on which base stations receive the beacon, and optionally other information such as geolocation based on beacon characteristics, the network determines when the UE moves between different cells. Details regarding when the UE moves from one cell to another are a matter of network implementation. In a dual layer case, that is, in a case where both macro cells and small cells are present, a similar approach may be used, but the macro layer also controls coverage by the small cell layer. In such a case, information relating to the UE's location may be inferred from the beacon by the macro layer, the small cell layer, or both.

FIG. 1 is a flow diagram 100 illustrating actions that are traditionally taken in a dual layer situation when a UE needs an uplink grant to transmit data. At events no, the UE periodically transmits a beacon signal that is received by a macro cell. At events 120, responsive to receiving a beacon signal, the macro cell updates a serving TRP set for a plurality of small cells. At event 130, the UE has uplink data to be transmitted to the macro cell. At event 140, the UE transmits a scheduling request (SR) and a buffer status report (BSR) to the macro cell. (This assumes that the small cells are handling only the user plane, which is a typical macro-assisted deployment.) At event 150, the macro cell requests a grant of uplink resources from one or more small cells serving the UE. At event 160, the macro cell receives a response with an uplink grant from the small cells. At optional event 165, the macro cell and the small cells may perform post-grant coordination, depending on the user plane design. At event 170, the macro cell sends the grant information to the UE on a control channel. That is, the UE is monitoring the control channel and receives a message at event 170 informing the UE of the grant and instructing the UE to tune to the small cell layer and send the uplink data to the small cell layer. Under existing procedures, the UE exits its DRX configuration at this point, but as described below, exiting DRX and entering a continuous transmission and reception mode may not be desirable. At event 180 the UE tunes to the small cell layer. At event 190 the UE transmits in the grant.

Figure 2:
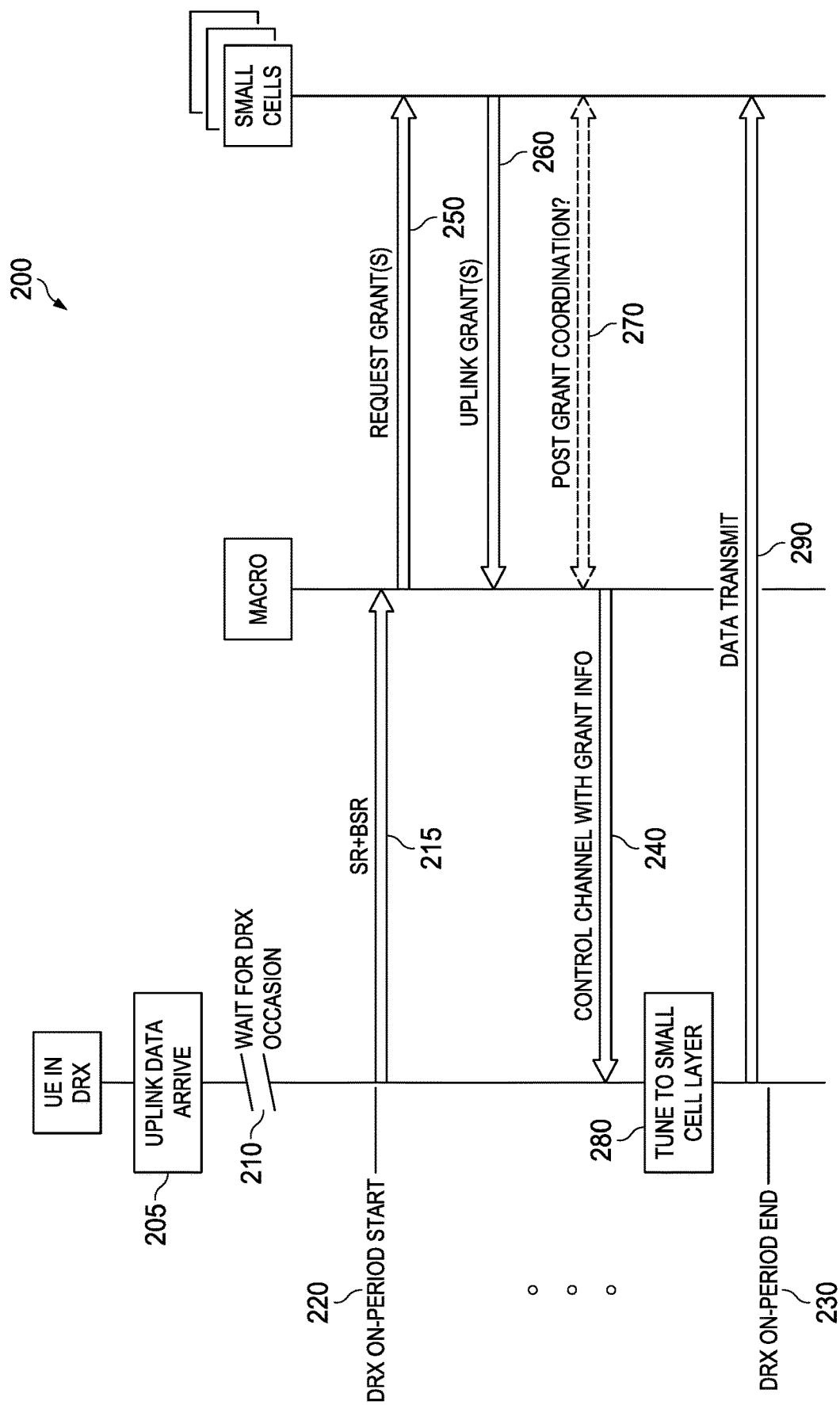
FIG. 2 is a flow diagram illustrating actions that may be taken in a dual layer situation when the UE needs an uplink grant to transmit data and the UE is in DRX.

FIG. 2 is a flow diagram 200 illustrating actions that may be taken in a dual layer situation when the UE needs an uplink grant to transmit data and the UE is in DRX. The beacons are not shown in FIG. 2, but their behavior may be similar to that in FIG. 1. It may be seen that the situation in FIG. 2 is similar to that illustrated in FIG. 1, except that, at event 210, the UE waits until the next DRX occasion to transmit the SR and BSR. That is, if the UE intends to remain in DRX, the UE may "hold" the SR and BSR until the start of the next DRX occasion at event 220. In such a case, the interaction between the macro cell and the small cells may increase the DRX on-period, which ends at event 230. The UE typically needs to be awake and waiting for the grant at event 240 during the DRX on-period. Events 205, 215, and 250-290 may occur substantially similarly to similar events in FIG. 1. It may be noted that holding the SR and BSR and remaining in DRX instead of waking up to a continuous communication mode is currently not allowed but may be allowed in the future.

As noted above, a current issue with DRX is that any transmission or reception activity disables DRX. Many applications have very low traffic loads and may be considered to be barely active. That is, such applications may transmit what may be considered "keep alive" signaling and may rarely transmit any other signaling. The small packets transmitted in such "heartbeat" signaling often are not time critical or high bandwidth and may not trigger any response or may trigger only a small response such as an acknowledgement. In such situations, every transmission may send the UE from the DRX mode back to full active mode unnecessarily.

Embodiments of the present disclosure provide an additional mode of DRX-related scheduling. This additional DRX scheduling mode may be used primarily for uplink data, but some aspects may also be applicable for the downlink. In an embodiment, a UE transmits a beacon independently from a DRX cycle. That is, the UE sends the beacon without coming out of its current DRX configuration of data-scheduled DRX or inactivity-based DRX. The UE includes in the beacon an SR, a BSR, or both. In this way, the UE may use the beacon to submit in advance a request for a grant to transmit uplink data. The network may use the beacon to estimate the position of the UE in terms of network topology (not necessarily geographically), may assign one or more TRPs to handle the uplink data transmission, and may negotiate the grant with the TRPs. The network may make the grant available to the UE at the next DRX on-period, at which time the UE wakes up to find that the requested grant is already configured, thus allowing the UE to transmit substantially immediately on the uplink resources, potentially without exiting its current DRX configuration.

The disclosed scheduling scheme may be particularly applicable when a macro layer serves as "support" or "control" for a small cell layer, such that the UE sends beacons toward the macro layer, but exchanges data on the small cell layer. If the small cells rely on beamforming, the positioning information from the beacon may also assist the initial beamforming configuration. That is, a positioning function in a network node or in a TRP may determine a location estimate of a UE. A TRP that is aware of the location estimate may communicate with the located UE in a beamformed configuration that was determined, at least in part, based on the location estimate.

The embodiments may operate in the context of a UE-centric configuration, in which multiple TRPs coordinate to appear to the UE as a continuous radio object ("virtual cell", "cloud cell", "no cell", etc.). The network may track which TRPs are close to the UE based on uplink beacon transmissions. The beacon transmissions may include a small amount of additional information, as disclosed herein in the context of certain embodiments.

From the perspective of a UE, the embodiments allow the UE to multiplex the SR and the BSR in the beacon without exiting DRX. The UE may transmit the beacon containing the SR and BSR whenever uplink data is pending, and in response the UE may receive an uplink grant to transmit the data at the next DRX occasion rather than as an immediate response to the SR. The UE transmits the data at the next DRX occasion as a response to the received grant.

From the perspective of the network, the network may use the SR, BSR, and beacon-related information, such as the approximate position of the UE, to preconfigure the appropriate small cells. The reservation of uplink grant resources and any coordination between the macro cell and the TRPs may occur before the UE's next DRX occasion. At the UE's next DRX occasion, the macro cell may send the uplink grant information, as determined from the SR and BSR and the timing of the DRX occasion. The UE may then apply legacy grant handling in tuning to the small cell layer and transmitting its data.

Figure 3:
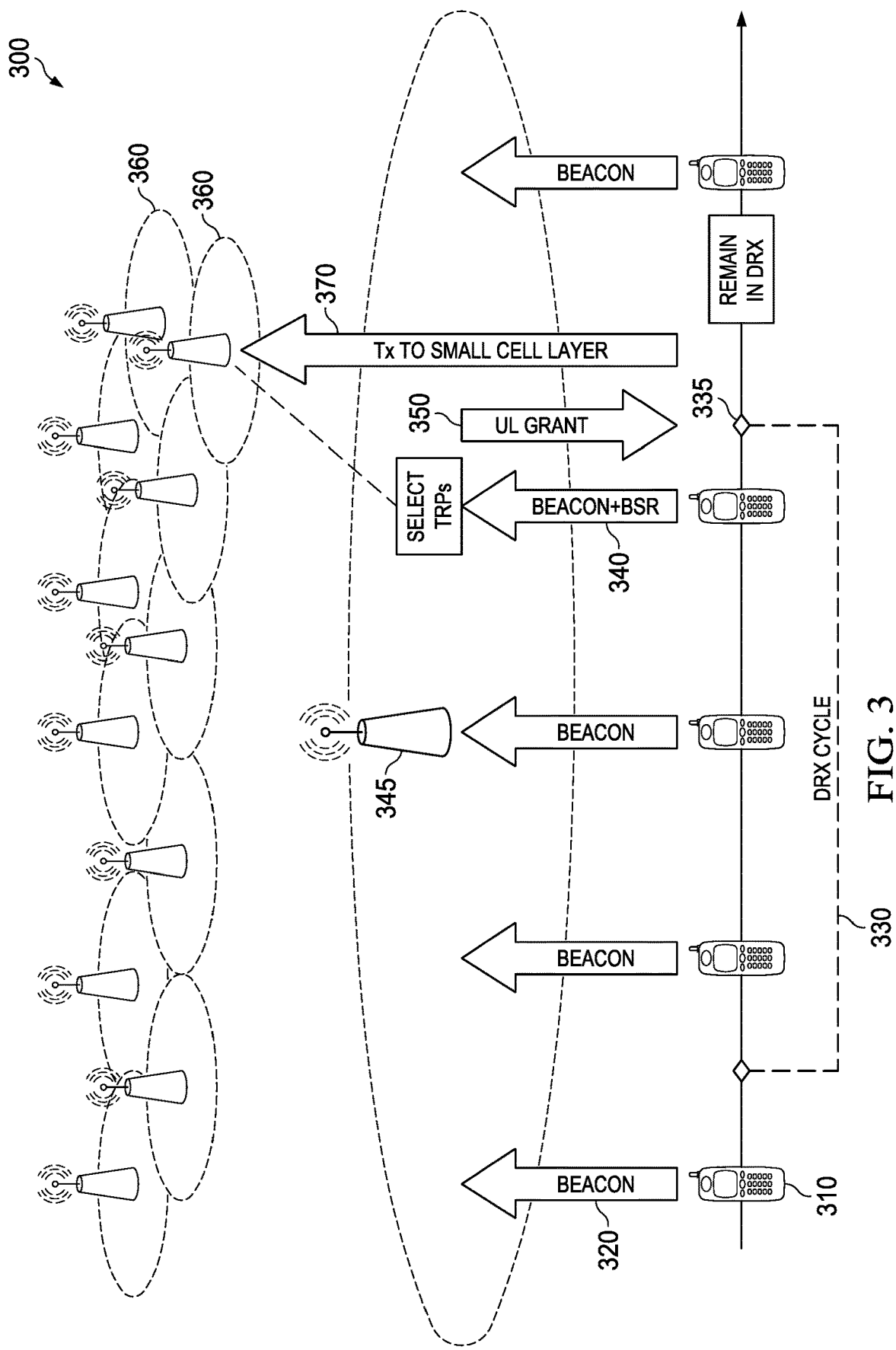
FIG. 3 is a block diagram of an embodiment of a UE transmitting a BSR in a beacon signal in a dual layer network.

FIG. 3 illustrates an example embodiment of a UE transmitting a BSR in a beacon signal in a dual layer network 300. A moving UE 310 transmits a beacon signal 320 at regular intervals, which may be referred to as beacon occasions. While in an off-period of a DRX cycle 330 the UE 310 requests a grant for an uplink transmission that is to occur at the next DRX opportunity 335 by including a BSR in one of the beacons 340. The BSR in the beacon 340 triggers a macro cell 345 to select one or more TRPs 360 appropriate for communication with the UE 310 and to request an uplink grant from the TRPs 360 for use by the UE 310 at the next DRX opportunity 335. When the next DRX opportunity 335 arrives, the macro cell 345 provides the requested uplink grant 350 to the UE 310. The UE 310 may use the uplink grant 350 to send a transmission 370 to one or more of the TRPs 360 while in the DRX on-period 335. In an embodiment, the macro cell 345 and the TRPs 360 may be on separate frequency layers.

In various embodiments, an SR and/or a BSR may be embedded in a beacon in various manners. If a BSR is not embedded in a beacon but an SR may be embedded in the beacon, a distinction may be made between a beacon that includes an SR and a beacon that does not include an SR. To do so, a flag may be embedded in a beacon that may have a first bit value indicating that an SR is present in the beacon and a second bit value indicating that an SR is not present in the beacon. Such a flag indicates that a grant is requested but does not indicate a size for the requested grant. Alternatively, no information may be embedded in the beacon. In such a scenario, a first radio resource element may be assigned to a UE for the case where a grant is requested, and a second radio resource element may be assigned to the UE for the case where a grant is not requested. The latter alternative doubles the resource usage per UE, so including an SR bit in the beacon may be preferred. Examples of different resource elements may include assignments in time, frequency, code, or other dimensions of the available radio resources.

The above methods of requesting a grant may not be appropriate in all situations, since neither provides any information regarding the size of the requested grant. With a narrowband beacon in particular, the absence or presence of an SR in a beacon may be the only information that can be sent to the network. In some cases, it may be desirable to include a BSR in the beacon to indicate the size of the grant that is requested. A BSR embedded in a beacon may be referred to as a beacon BSR (BBSR).

The manner in which a BBSR may be included in a beacon may depend on the beacon format. In an embodiment, more than one sequence, such as a Zadoff-Chu sequence, may be defined for each UE. If the BBSR is quantized to N levels, each UE needs N+1 sequences and the base station receiver needs to try N+1 decoding hypotheses for each UE when attempting to decode the beacon transmission. Thus, it may be preferable for N to be small. Table 1 shows an example with different values of a BBSR index indicating different meanings and with N=3. In this example, a BBSR index of 0 indicates that no SR is present in the beacon, a BBSR index of 1 indicates that the buffer size is less than 8 octets, a BBSR index of 2 indicates that the buffer size is greater than 8 octets and less than 16 octets, and a BBSR index of 3 indicates that the buffer size is greater than 16 octets and that a grant for a traditional full BSR is needed. In other examples, other meanings could be given to these or other BBSR indices. However, it may be preferable that one index be reserved to indicate that the buffer size exceeds a threshold and that the UE needs a grant that can contain a full BSR.

TABLE 1

| BBSR index (sequence ID) | Meaning/data size |
| --- | --- |
| 0 | No SR |
| 1 | Buffer size <8 octets |
| 2 | 8 < Buffer size < 16 |
| 3 | Larger data, give grant for full BSR |

Figure 4:
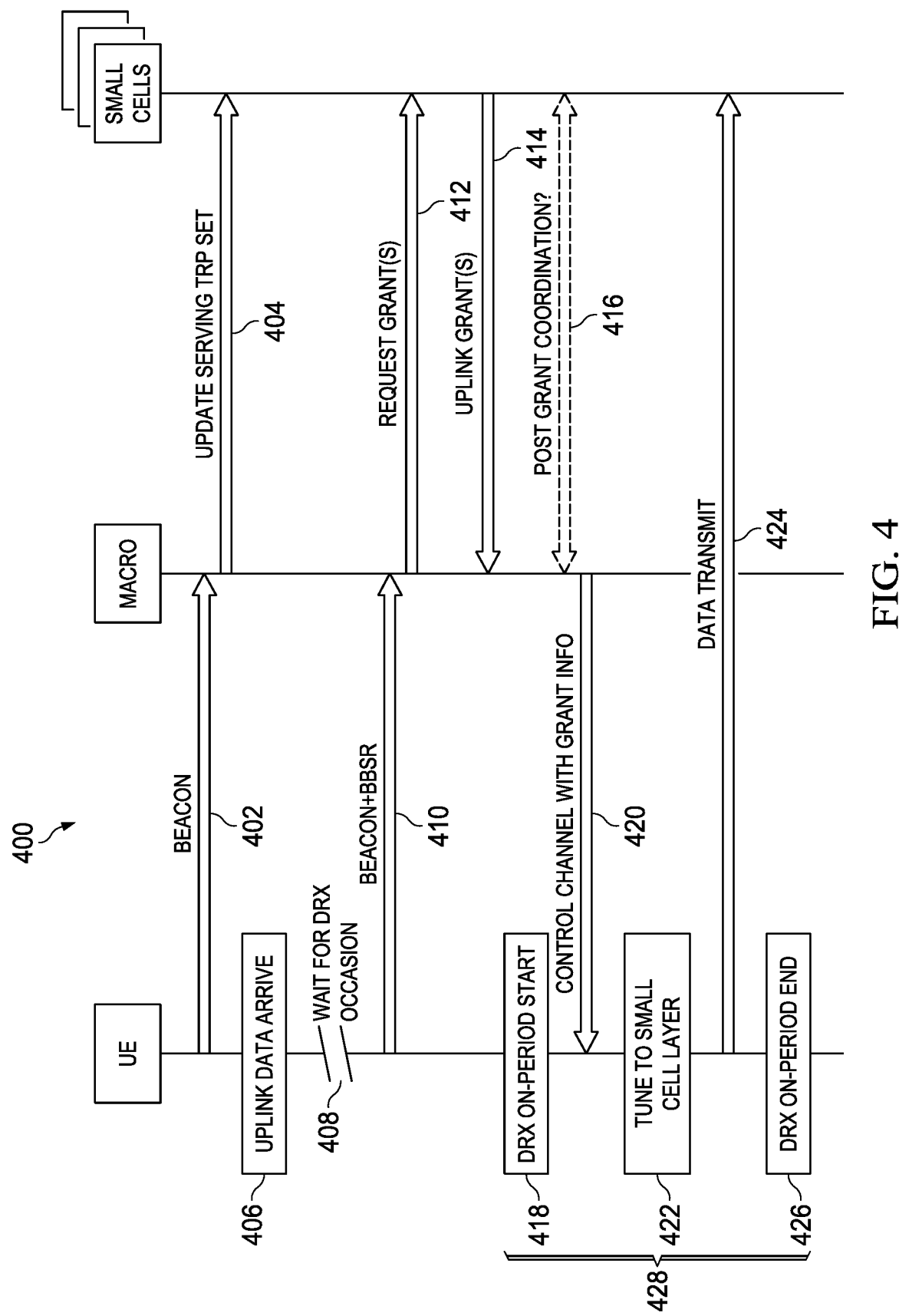
FIG. 4 is a flow diagram illustrating embodiment actions that may be taken when a UE uses a BBSR as a request for an uplink grant for the next DRX occasion.

FIG. 4 is a flow diagram 400 illustrating embodiment actions that may be taken when a UE uses a BBSR as a request for an uplink grant for the next DRX occasion. At event 402, the UE transmits a beacon signal that is received by a macro cell. At event 404, responsive to receiving the beacon signal, the macro cell updates a serving TRP set of small cells. At event 406, the UE has uplink data to be transmitted to the macro cell. A time period 408 then occurs in which the UE is waiting for the next DRX occasion or on-period. At event 410 before the next DRX on-period occurs, the UE transmits a beacon signal that includes a BBSR. At event 412, responsive to receiving the beacon signal with the BBSR, the macro cell requests one or more uplink grants from one or more small cells. At event 414, the small cells provide the uplink grants. At optional event 416, the macro cell and the small cells may perform post-grant coordination. At event 418, a DRX on-period starts, and the UE becomes capable of receiving grant information. At event 420 the macro cell transmits grant information to the UE on a control channel.

Summarizing events 410-420 the UE sends the beacon prior to the start of the DRX on-period at event 418 so that there is time for the exchange to occur between the macro cell and the small cells in events 412 and 414. The UE may wait to transmit the beacon until a time close enough to the start of the DRX on-period that the UE is not asking the macro cell and the small cells to negotiate a grant far in advance. Alternatively, since the macro node knows when the next DRX on-period will occur, the macro node may delay the negotiation with the small cells. Sending the beacon with the embedded BBSR prior to the start of the DRX on-period in which the UE intends to transmit uplink data allows the uplink grant to be preconfigured without the UE coming out of DRX. That is, the BBSR embedded in the beacon allows the UE to make a grant request while staying in its current DRX configuration.

At event 422, the UE tunes to the small cell layer. At event 424, the UE transmits data to one or more small cells using the uplink grant. At event 426, the DRX on-period ends. Thus, the time from event 418 to event 426 is an on-period 428.

In an embodiment, additional actions that are not shown in FIG. 4 may occur after the data transmission that occurs at event 424. For example, the macro cell may send the UE an indication of a transmission configuration to be used by the UE after the data transmission at event 424. The transmission configuration may be a configuration in which the UE remains in the continuous communication mode that the UE entered to transmit data at event 424. Alternatively, the transmission configuration may be a configuration in which the UE returns to the discontinuous communication mode. Alternatively or additionally, the transmission configuration may be a change in a period associated with the discontinuous communication mode. In an embodiment, the macro cell determines the transmission configuration and sends an indication of the determined transmission configuration to the UE. The UE parses the indication and implements the indicated transmission configuration. In another embodiment, the UE sends the macro cell a request for a transmission configuration that the UE would prefer to use, and the indication of the transmission configuration consists of a confirmation from the macro cell that the UE is to use the requested transmission configuration.

Figure 5:
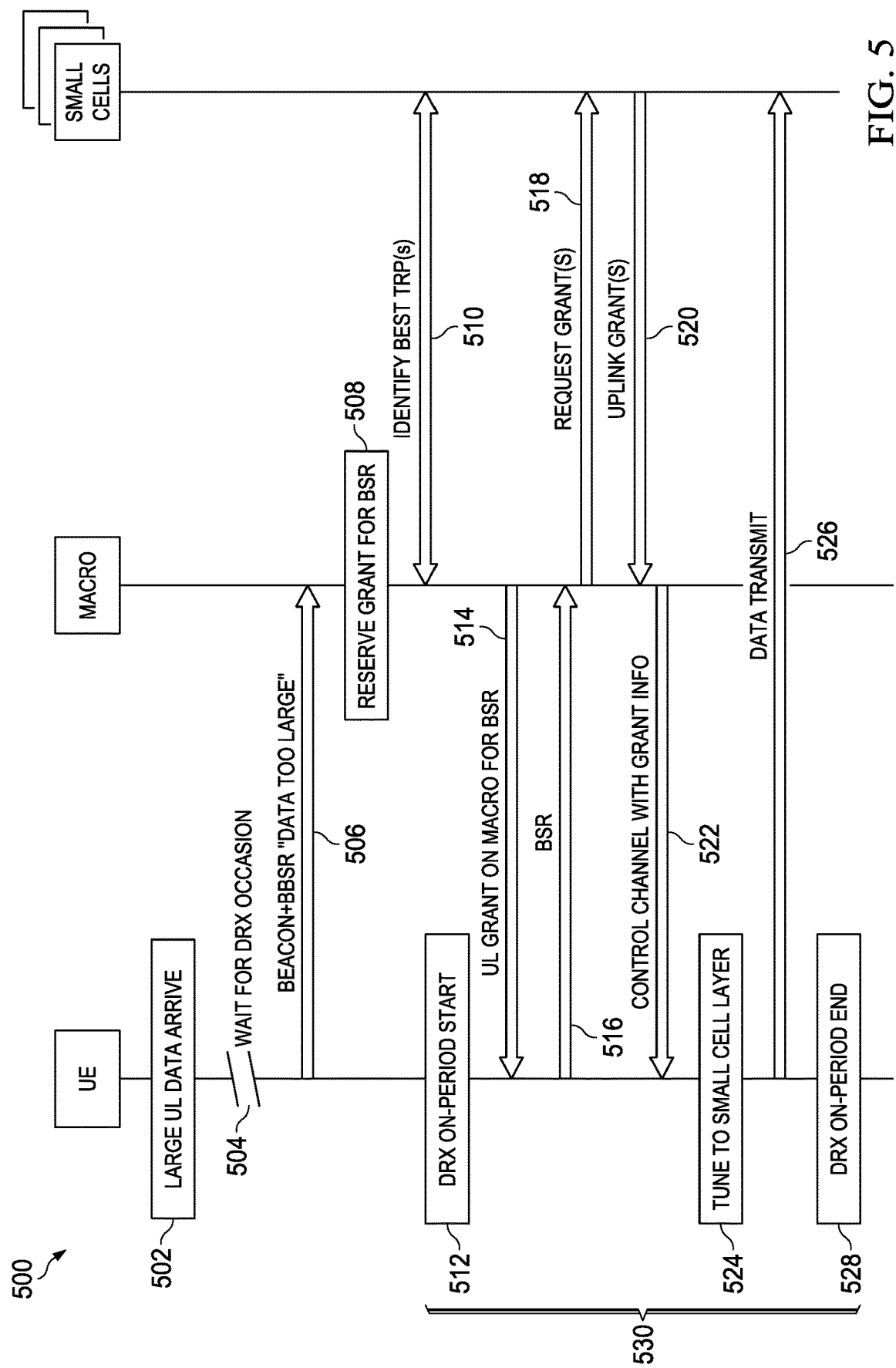
FIG. 5 is a flow diagram illustrating embodiment actions that may be taken when the amount of uplink data is too large to be specified in a BBSR or when only an SR is sent in a beacon.

FIG. 5 is a flow diagram 500 illustrating embodiment actions that may be taken when the amount of uplink data is too large to be specified in a BBSR or when only an SR is sent in a beacon. That is, the flow diagram 500 illustrates scenarios where a grant for a full BSR is requested. At event 502, a UE has a large amount of uplink data to be transmitted to a macro cell. A time period 504 then occurs in which the UE is waiting for the next DRX occasion. At event 506, the UE transmits a beacon signal with an indication that there is too much data for the data size to be indicated by a BSR sent in the beacon. At event 508, the macro cell reserves a grant for a full BSR. At event 510, the macro cell and the small cells identify the most appropriate TRPs with which the UE is to communicate. At event 512, a DRX on-period starts. At event 514, the macro cell provides the UE with an uplink grant for the BSR. At event 516, the UE transmits the BSR. At event 518, the macro cell requests one or more uplink grants from one or more small cells based on the BSR. At event 520 the small cells provide the uplink grants. At event 522, the macro cell transmits grant information to the UE on a control channel. At event 524, the UE tunes to the small cell layer. At event 526, the UE transmits data to one or more small cells. At event 528, the DRX on-period ends. Thus, the time from event 512 to event 528 is an on-period 530.

A benefit of the embodiments in which the UE transmits a beacon with an SR and/or a BBSR before the start of the DRX on-period in which the UE intends to transmit uplink data is that the UE may reduce its DRX on-duration, compared to the case where the UE starts transmission of an SR and/or a full BSR at the DRX occasion. However, in the case where only the SR is sent in the beacon or in the case where the amount of data is too large for the BBSR, the benefit may be reduced, because the network may need to receive a full BSR in the DRX on-period before requesting grants from the TRPs. In such cases, the DRX on-period may need to be extended compared to cases where the BBSR is embedded in the beacon. That is, when the BBSR is not embedded in the beacon, additional time may be needed in the DRX on-period to accommodate an additional round trip on the air between the UE and the macro cell to request a second grant for the actual data and an additional round trip on the backhaul between the macro cell and the small cells to configure the second grant for the actual data.

In an embodiment, in certain such cases, the TRPs with which a UE will communicate may still be identified in advance, and the network may be able to reserve large grants in advance even though the network receives no indication of the size of the grant needed. This advance identification and reservation may be possible in an ultra-dense network deployment, because the capacity is high in such networks, the number of users per TRP is low, and throughput is not resource-limited. Therefore, in such cases, it may be reasonable to allocate one or more TRP's resources as a contingency without regard to whether or not the resources will eventually be used. Such contingent reservation may be appropriate in high frequency beamforming cases, where throughput is high and a beam typically serves only one user. The grant may allocate a TRP's entire bandwidth since no other user may be competing for the bandwidth. Such a technique may be particularly appropriate in millimeter wave (mmW) scenarios, since aggressive beamforming is typically employed in such cases to maintain the UE in the connected mode, and it is likely that there is only one UE per beam at any instant.

Figure 6:
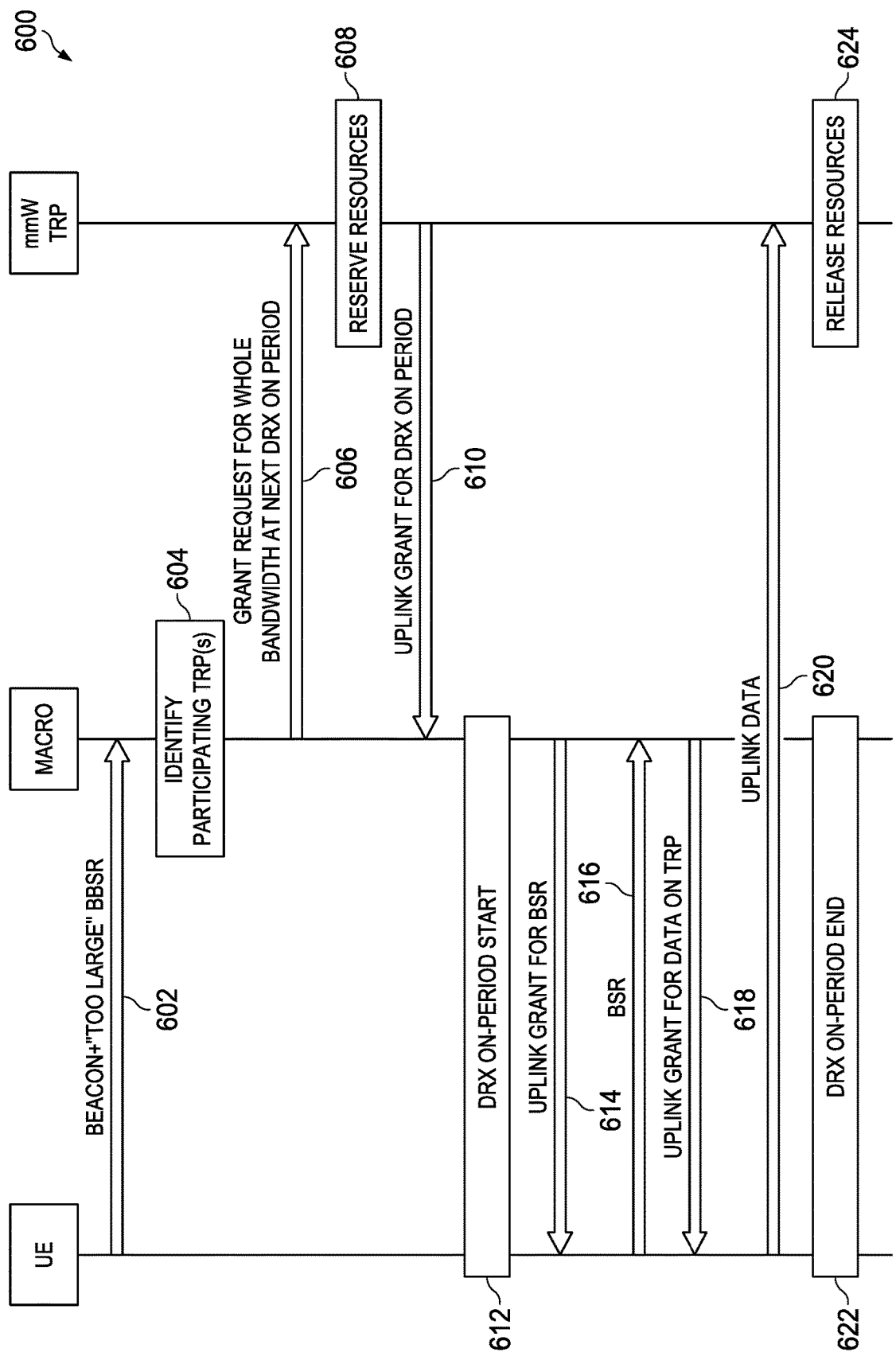
FIG. 6 is a flow diagram illustrating embodiment actions that may be taken when a network reserves a grant in advance with no indication of the size of the grant needed.

FIG. 6 is a flow diagram 600 illustrating embodiment actions that may be taken in such a scenario. At event 602, a UE transmits a beacon signal with an indication that that there is too much data for the data size to be indicated by a BSR sent in the beacon. Thus, a macro cell that receives the beacon is aware that the UE will need a full BSR. At event 604, the macro cell identifies one or more participating mmW TRPs. At event 606, the macro cell transmits to the TRPs a grant request for the entire bandwidth at the next DRX on-period. At event 608, at least one TRP reserves uplink resources. At event 610, the TRP transmits an uplink grant to the macro cell for use by the UE in the next DRX on-period. Alternatively, it may be determined at some point that the UE does not need the reserved uplink resources, and the reserved uplink resources may be released. At event 612, a DRX on-period starts. If the UE needs the reserved uplink resources, the macro cell transmits an uplink grant for a BSR to the UE at event 614. At event 616, the UE transmits the BSR to the macro cell. The macro cell uses the BSR information to determine how to configure an uplink grant in terms of the modulation and coding to be used for the data to be transmitted by the UE. At event 618, the macro cell sends the UE an uplink grant for transmitting data to the TRP. At event 620, the UE transmits uplink data to the TRP. At event 622, the DRX on-period ends. At event 624, the TRP releases resources.

The technique disclosed in FIG. 6 may save time on the backhaul compared to the case in FIG. 5 where a grant is requested in the BBSR, even though additional signaling may occur over the air in the scenario of FIG. 6 compared to that of FIG. 5. That is, if the backhaul in the scenario of FIG. 6 is relatively slow, significant time savings may be achieved compared to the flow in FIG. 5, since less backhaul signaling occurs in the scenario of FIG. 6. Namely, in the scenario of FIG. 6, there is no backhaul signaling to identify the best TRPs as there is in the scenario of FIG. 5.

In the flow diagram 600 of FIG. 6, the BSR is already queued for transmission after event 602. If the network provides a large grant at event 614, the UE sends the BSR, and any additional space may be used for logical channel data. In an embodiment, if the grant provided at event 614 is large enough to contain all the uplink data, it may be possible to "retract" the BSR after event 614. That is, the BSR may not be transmitted, and actual data may be transmitted in the grant instead.

Figure 7:
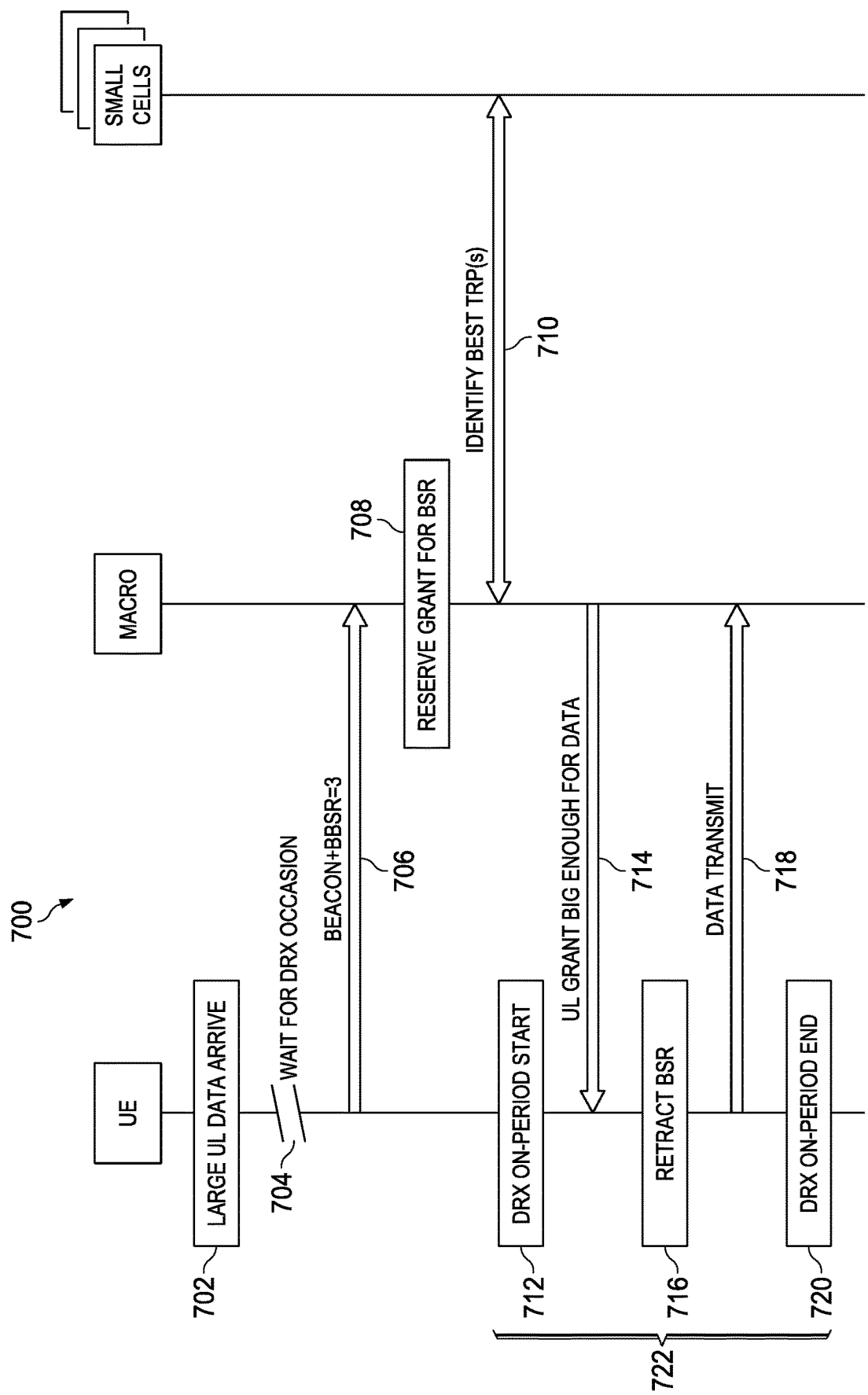
FIG. 7 is a flow diagram illustrating embodiment actions that may be taken when a UE retracts a BSR.

FIG. 7 is a flow diagram 700 illustrating embodiment actions that may be taken in such a scenario. At event 702, a UE has a large amount of uplink data to be transmitted. A time period 704 then occurs in which the UE is waiting for the next DRX occasion. At event 706, the UE transmits a beacon signal with an indication that that there is too much data for the data size to be indicated by a BSR sent in the beacon. At event 708, responsive to receiving the beacon, a macro cell reserves a grant for a full BSR. At event 710, the macro cell and one or more small cells identify the most appropriate TRPs with which the UE is to communicate. At event 712, a DRX on-period starts. At event 714, the macro cell provides the UE with an uplink grant large enough for the uplink data to be transmitted by the UE. At event 716, the UE retracts the BSR. That is, the UE deletes the packet representing the BSR from its transmission queues. At event 718, the UE transmits data to the macro cell in the grant received at event 714. At event 720 the DRX on-period ends. Thus, the time from event 712 to event 720 is an on-period 722.

In cases where a network does not have a separate controlling layer, that is, when a UE communicates directly with a small cell layer, the embodiments disclosed above may still be applicable within the small cell layer. A UE-centric no-cell (UCNC) configuration or a similar configuration may be assumed in such cases, such that the small cell TRPs have a common beacon configuration for the UE. The TRPs may decide individually or collectively whether and how to serve the UE, based on their measurements of the beacon. Grant and data coordination may be performed by a common control unit or centralized unit (CU) to which the TRPs send their measurement data. Such a CU may be referred to herein as a radio control unit (RCU). An example of an RCU may be a controlling entity within the gNB proposed in the Third Generation Partnership Project (3GPP) 5G standards.

Figure 8:
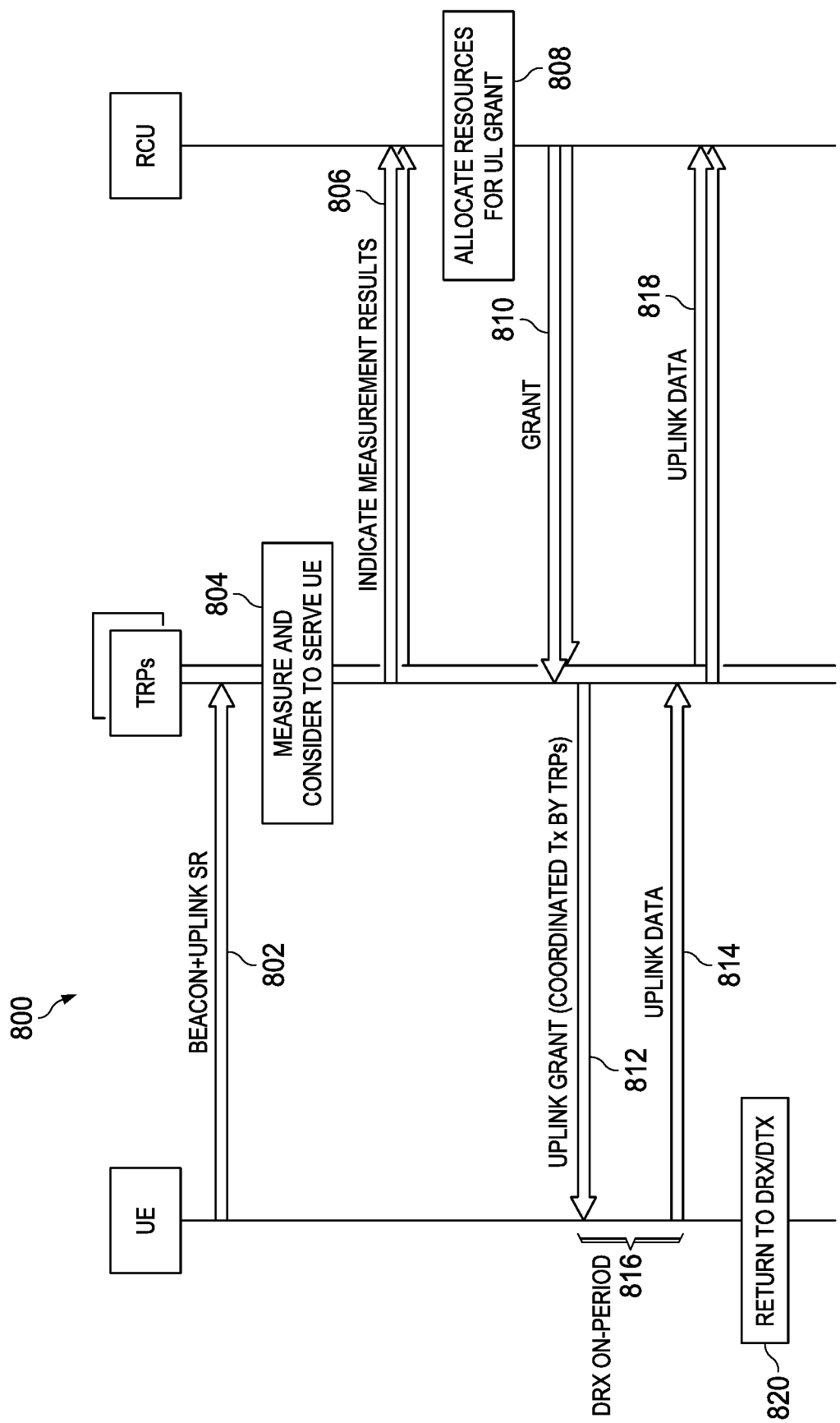
FIG. 8 is a flow diagram illustrating embodiment actions that may be taken when a UE communicates directly with a small cell layer.

FIG. 8 is a flow diagram 800 illustrating embodiment actions that may be taken in such a scenario. At event 802, a UE transmits a beacon and an uplink SR to one or more TRPs. At event 804, the TRPs measure and consider whether to serve the UE. At event 806, the TRPs indicate their measurement results to an RCU. At event 808, the RCU allocates resources for an uplink grant. At event 810, the RCU sends the grant to the TRPs. At event 812, the TRPs send the grant to the UE in a coordinated transmission. The coordinated transmission may be a completely bit-aligned, single frequency network-type transmission, where the TRPs physically appear over the air like a single transmitter. Alternatively, the coordinated transmission may be a transmission with a looser synchronization requirement, such as coordinated multi-point (CoMP) transmission, where the UE receives a data stream from several different TRPs and combines the transmissions. Alternatively, some other type of coordination may be employed. At event 814, the UE transmits uplink data to the TRPs. Events 812 and 814 may occur within a DRX on-period 816. At event 818, the TRPs that receive the uplink data transmit the uplink data to the RCU for handling in the network. At event 820 the UE returns to DRX/DTX. That is, the UE maintains its existing DRX configuration after the DRX on-period 816 ends.

The discussion thus far has been directed toward the inactivity-based DRX configuration, but the data-scheduled DRX configuration, such as semi-persistent scheduling, may also benefit from locating with beacons. In such a configuration, the network knows the UE will need a grant at each DRX on-period, such as every 20 milliseconds. The network also knows that it is preferable that the UE stay in its current DRX configuration after the grant has been used. As the UE moves through the network sending beacons, the network may use the direction from which the beacons are arriving to identify, before the next DRX occasion, the TRPs that will be involved in communication with the UE. The network may preconfigure grants for the UE based on the beacon position, in advance of the next DRX occasion. Since each grant has a known format, no additional information may be needed.

Figure 9:
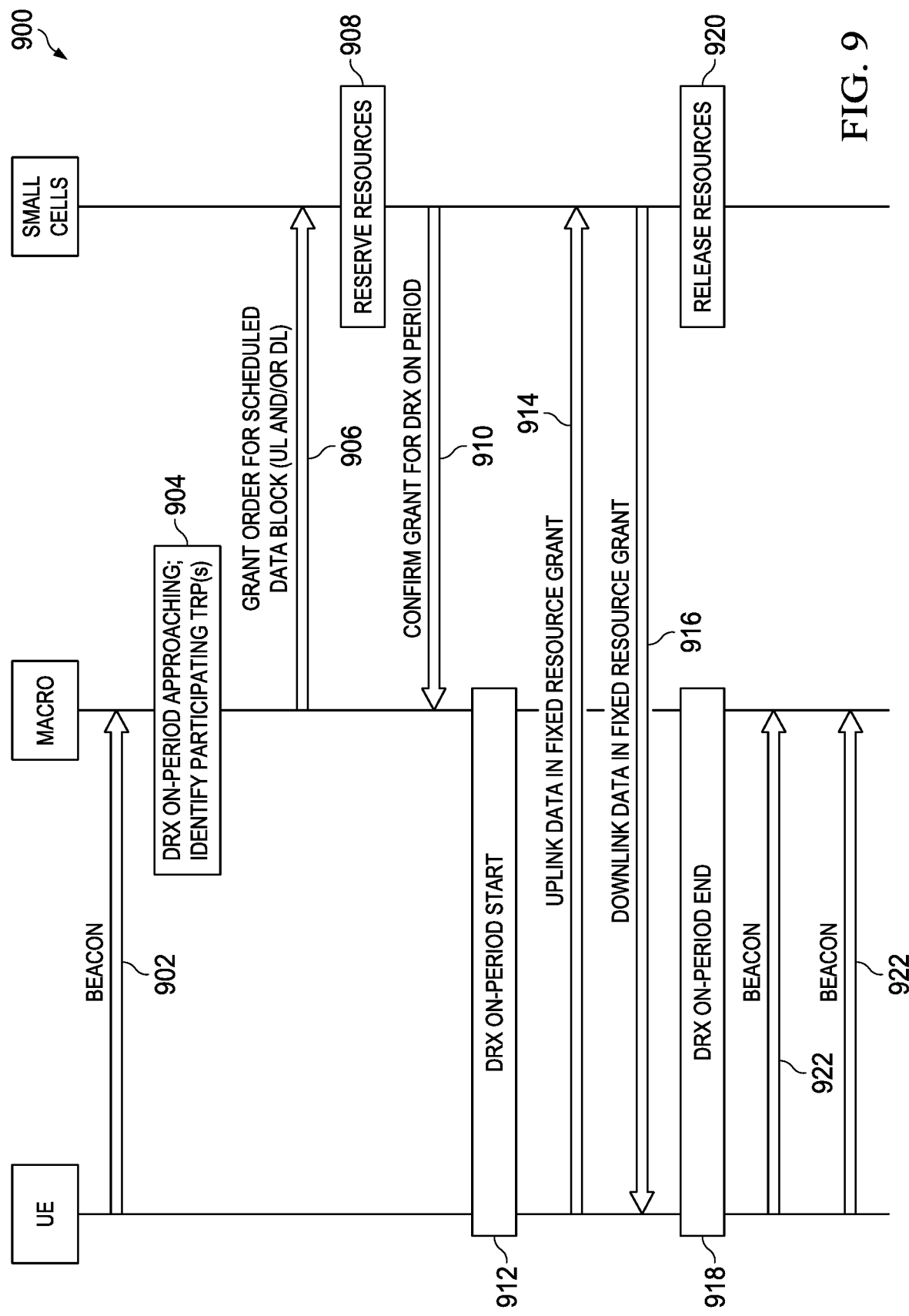
FIG. 9 is a flow diagram illustrating embodiment actions that may be taken when beacons are used for advance scheduling in the case of data-scheduled DRX.

FIG. 9 is a flow diagram 900 illustrating embodiment actions that may be taken when beacons are used for advance scheduling in the case of data-scheduled DRX. At event 902, a UE transmits a beacon that is received by a macro cell. At event 904, the macro cell recognizes that a DRX on-period is approaching and identifies one or more TRPs that may participate in communication with the UE. At event 906, the macro cell transmits a grant order for a scheduled data block in the uplink and/or downlink. At event 908, one or more small cells reserve resources for a transmission. At event 910, the small cells transmit a confirmation of a grant for the upcoming DRX on-period. At event 912, the DRX on-period starts. The resource grant is available to the UE when the DRX on-period starts and has a fixed configuration based on the semi-persistent scheduling configuration. Therefore, the UE may substantially immediately begin sending data in the grant and potentially begin receiving downlink data in a fixed downlink grant at the same time. At event 914, the UE transmits uplink data in a fixed resource grant. At event 916, the small cells transmit downlink data in a fixed resource grant. At event 918, the DRX period ends. At event 920, the small cells release the reserved resources. At events 922, the UE transmits its regularly scheduled beacons. It may be noted that the embodiment events 904-910 occur before the start of a DRX on-period, while in existing scheduling procedures, similar steps occur after the start of a DRX on-period.

Figure 10:
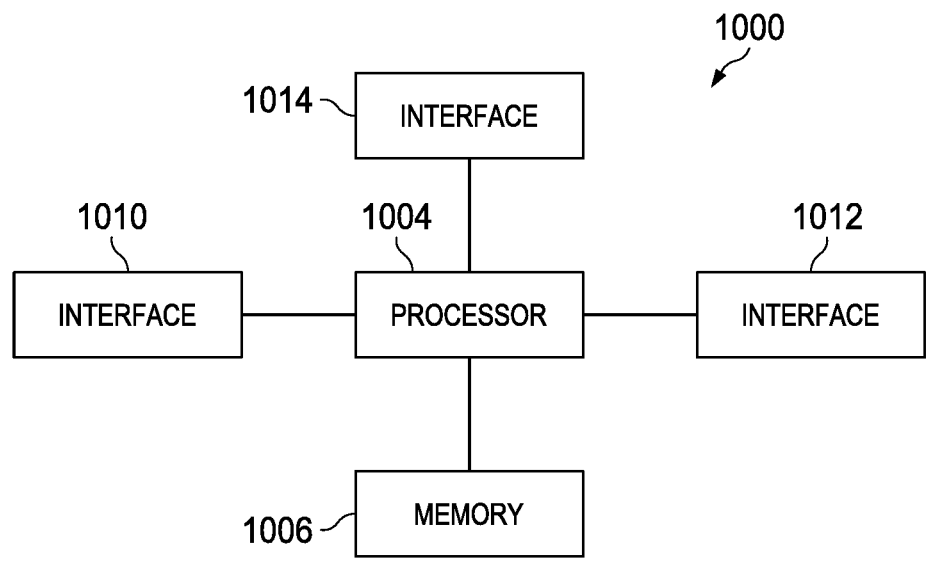
FIG. 10 illustrates a block diagram of an embodiment processing system for performing methods described herein.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown the figure. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in the figure, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
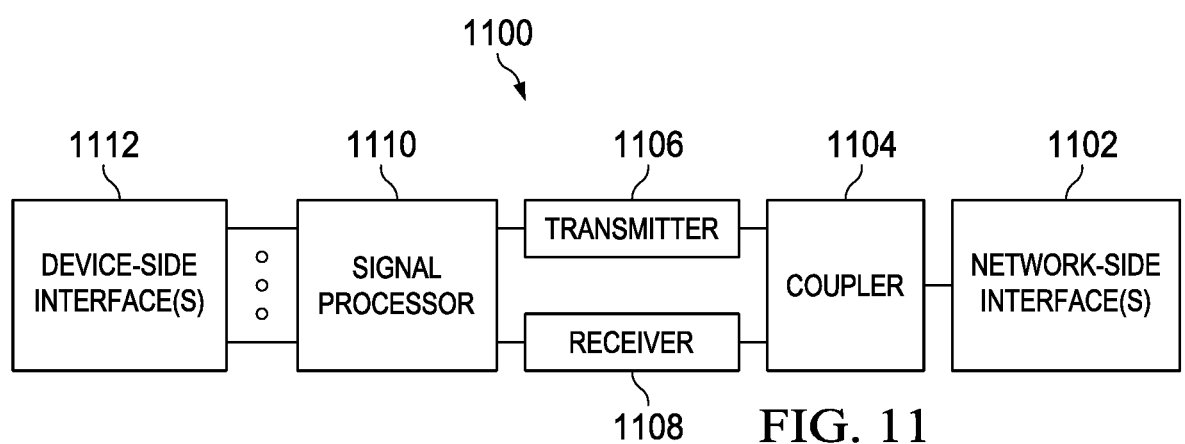
FIG. 11 illustrates a block diagram of a transceiver adapted to transmit and receive signaling over a telecommunications network.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110 and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a configuring unit/module. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for assigning radio resources to a user equipment (UE), the method comprising:
   receiving, by a macro network node from the UE, an uplink beacon transmission during a beacon occasion of the UE, the uplink beacon transmission being a low power signal indicating to a network that the UE is present in the network;
   determining, by the macro network node, that the uplink beacon transmission corresponds to a need by the UE for radio resources in an upcoming communication occasion of a discontinuous communication mode implemented by the UE;
   identifying, by the macro network node, at least one small cell transmit/receive point (TRP) to participate in data communication with the UE;
   receiving, by the macro network node from the at least one small cell TRP via a backhaul link, a grant of radio resources by the at least one small cell TRP for the data communication, the grant of radio resources being specified for use in the upcoming communication occasion; and
   transmitting, by the macro network node, the grant of radio resources to the UE.

2. The method of claim 1, further comprising:
   determining a transmission configuration to be used after the data communication ends, the transmission configuration being at least one of:
      the UE remaining in a continuous communication mode,
      the UE returning to the discontinuous communication mode, or
      a change in a period of the discontinuous communication mode; and
   transmitting an indication of the transmission configuration to the UE.

3. The method of claim 2, wherein determining the transmission configuration is performed responsive to reception of a request for the transmission configuration.

4. The method of claim 1, wherein the at least one small cell TRP is on a separate frequency layer from the macro network node that receives the uplink beacon transmission.

5. The method of claim 1, further comprising:
   determining a location estimate of the UE;
   determining, based at least in part on the location estimate, a beamformed configuration with which the at least one small cell TRP is to communicate with the UE; and
   transmitting, from the macro network node, an indication of the beamformed configuration to the at least one small cell TRP.

6. The method of claim 1, wherein the need for radio resources is determined based on a presence in the uplink beacon transmission of at least one of a scheduling request or a buffer status report.

7. The method of claim 1, wherein, in a communication mode in which communication occasions occur at periodic intervals, the need for radio resources is inferred based on recognition of the upcoming communication occasion.

8. A method for communication by a user equipment (UE), the method comprising:
   transmitting, by the UE, during an off-period of a discontinuous communication mode implemented by the UE, an uplink beacon containing at least one of a scheduling request or a buffer status report, the uplink beacon being a low power signal indicating to a network that the UE is present in the network;
   receiving, by the UE, at a next on-period of the discontinuous communication mode implemented by the UE, a grant of radio resources, forwarded from at least one small cell transmit/receive point (TRP) by a macro network node, for communication with the at least one small cell TRP; and
   communicating between the UE and the at least one small cell TRP in the granted radio resources.

9. The method of claim 8, wherein the uplink beacon includes at least one of:
   a flag to indicate whether the uplink beacon includes the scheduling request;
   an index to indicate an amount of data to be transmitted by the UE; or
   a request for a transmission configuration to be used by the UE after communication between the UE and the at least one small cell TRP in the granted radio resources ends.

10. The method of claim 9, wherein the transmission configuration is at least one of:
the UE remaining in a continuous communication mode;
the UE returning to the discontinuous communication mode; or
a change in a period of the discontinuous communication mode.

11. The method of claim 8, wherein, when the UE requests the grant of radio resources for transmission of a full buffer status report and receives a grant large enough for all uplink data currently scheduled to be transmitted by the UE, the UE transmits the uplink data in the grant of radio resources for the full buffer status report and deletes the full buffer status report from a transmission queue.

12. A macro network node comprising:
a non-transitory memory storage comprising instructions; and
one or more processors in communication with the memory, wherein the one or more processors execute the instructions to:
receive an uplink beacon transmission from a user equipment (UE) during a beacon occasion of the UE, wherein the uplink beacon transmission is a low power signal indicating to a network that the UE is present in the network;
determine that the uplink beacon transmission corresponds to a need by the UE for radio resources in an upcoming communication occasion of a discontinuous communication mode implemented by the UE;
identify at least one small cell transmit/receive point (TRP) to participate in data communication with the UE;
receive, from the at least one small cell TRP via a backhaul link, a grant of radio resources by the at least one small cell TRP for the data communication, wherein the grant of radio resources is specified for use in the upcoming communication occasion; and
transmit the grant of radio resources to the UE.

13. The macro network node of claim 12, wherein the one or more processors execute the instructions to:
determine a transmission configuration to be used after the data communication ends, wherein the transmission configuration is at least one of:
the UE remaining in a continuous communication mode,
the UE returning to the discontinuous communication mode, or
a change in a period of the discontinuous communication mode; and
transmit an indication of the transmission configuration to the UE.

14. The macro network node of claim 12, wherein the macro network node is on a separate frequency layer from the at least one small cell TRP.

15. The macro network node of claim 12, wherein the one or more processors execute the instructions to:
determine a location estimate of the UE;
determine, based at least in part on the location estimate, a beamformed configuration with which the at least one small cell TRP is to communicate with the UE; and
transmit an indication of the beamformed configuration to the at least one small cell TRP.

16. The macro network node of claim 12, wherein the one or more processors execute the instructions to determine the need for radio resources based on a presence in the uplink beacon transmission of at least one of a scheduling request or a buffer status report.

17. The macro network node of claim 12, wherein the one or more processors execute the instructions to, in a communication mode in which communication occasions occur at periodic intervals, infer the need for radio resources based on recognition of the upcoming communication occasion.

18. A user equipment (UE):
a transmitter configured to transmit, during an off-period of a discontinuous communication mode implemented by the UE, an uplink beacon containing at least one of a scheduling request or a buffer status report, wherein the uplink beacon is a low power signal indicating to a network that the UE is present in the network; and
a receiver configured to receive, at a next on-period of the discontinuous communication mode implemented by the UE, a grant of radio resources, forwarded from at least one small cell transmit/receive point (TRP) by a macro network node, for communication with the at least one small cell TRP, wherein the UE and the at least one small cell TRP communicate in the granted radio resources.

19. The UE of claim 18, wherein the uplink beacon includes at least one of:
a flag to indicate whether the uplink beacon includes the scheduling request;
an index to indicate an amount of data to be transmitted by the UE; or
a request for a transmission configuration to be used by the UE after communication between the UE and the at least one small cell TRP in the granted radio resources ends, wherein the transmission configuration is at least one of:
the UE remaining in a continuous communication mode,
the UE returning to the discontinuous communication mode, or
a change in a period of the discontinuous communication mode.

20. The UE of claim 18, wherein, in response to the UE requesting the grant of radio resources for transmission of a full buffer status report and receiving a grant large enough for all uplink data currently scheduled to be transmitted by the UE, the transmitter transmits the uplink data in the grant of radio resources for the full buffer status report and deletes the full buffer status report from a transmission queue.

21. A small cell transmit/receive point (TRP) comprising:
a non-transitory memory storage comprising instructions; and
one or more processors in communication with the memory, wherein the one or more processors execute the instructions to:
receive, from a macro network node via a backhaul link, a request for measurements of at least one uplink beacon transmission;
receive a first uplink beacon transmission from a user equipment (UE) during a beacon occasion of the UE, wherein the first uplink beacon transmission is a low power signal indicating to a network that the UE is present in the network;
transmit, to the macro network node via the backhaul link, measurements of the received first uplink beacon transmission to the macro network node;
receive, by the small cell TRP from the macro network node via the backhaul link, a request for a grant of radio resources for data communication by the UE with the small cell TRP;
specify the grant of radio resources for use in an upcoming communication occasion;

transmit, by the small cell TRP to the macro network node via the backhaul link, the grant of radio resources for the data communication with the small cell TRP; and communicate with the UE in the granted radio resources.

22. The small cell TRP of claim 21, wherein one or more processors execute the instructions to receive an indication of a beamformed configuration from the macro network node.

23. A method for communication by a small cell transmit/receive point (TRP), the method comprising:

receiving, by the small cell TRP from a macro network node via a backhaul link, a request for measurements of at least one uplink beacon transmission;

receiving, by the small cell TRP, a first uplink beacon transmission from a user equipment (UE) during a beacon occasion of the UE, the first uplink beacon transmission being a low power signal indicating to a network that the UE is present in the network;

transmitting, by the small cell TRP to the macro network node via the backhaul link, measurements of the received first uplink beacon transmission;

receiving, by the small cell TRP from the macro network node via the backhaul link, a request for a grant of radio resources for data communication by the UE with the small cell TRP;

specifying the grant of radio resources for use in an upcoming communication occasion;

transmitting, by the small cell TRP to the macro network node via the backhaul link, the grant of radio resources for the data communication with the small cell TRP; and communicating, by the small cell TRP with the UE in the granted radio resources.

24. The method of claim 23, further comprising receiving an indication of a beamformed configuration from the macro network node.

* * * * *